HANS O. STOEVER
RICHARD K. LEINBACH
INVENTORS

ATTORNEYS

Dec. 9, 1969      H. O. STOEVER ETAL      3,482,574
ARTIFICIAL KIDNEY SYSTEM PROVIDED WITH A LEVER
ACTUATED SHUNT COUPLING MECHANISM
Filed Jan. 12, 1967                    5 Sheets-Sheet 4

HANS O. STOEVER
RICHARD K. LEINBACH
INVENTORS

BY James A. Smith
Robert W. Hampton
ATTORNEYS

Dec. 9, 1969          H. O. STOEVER ETAL          3,482,574
         ARTIFICIAL KIDNEY SYSTEM PROVIDED WITH A LEVER
                ACTUATED SHUNT COUPLING MECHANISM
Filed Jan. 12, 1967                              5 Sheets-Sheet 5

HANS O. STOEVER
RICHARD K. LEINBACH
       INVENTORS

BY

ATTORNEYS

United States Patent Office 3,482,574
Patented Dec. 9, 1969

3,482,574
ARTIFICIAL KIDNEY SYSTEM PROVIDED WITH A LEVER ACTUATED SHUNT COUPLING MECHANISM
Hans O. Stoever and Richard K. Leinbach, Rochester N.Y., assignors to Eastman Kodak Company, Rochester, N.Y., a corporation of New Jersey
Filed Jan. 12, 1967, Ser. No. 608,922
Int. Cl. A61m 5/00, 25/00
U.S. Cl. 128—214
9 Claims

ABSTRACT OF THE DISCLOSURE

This application discloses an artificial kidney system comprising a shunt system adapted to be coupled to a patient's circulatory system, a dialyzing system, and a coupling mechanism for coupling the shunt system to the dialyzing system. The coupling mechanism comprises a housing adapted to receive a body portion such as the patient's arm. A mechanism positioned within the housing is effective to selectively couple coupling members associated with the shunt and dialyzing system to couple the two systems.

---

This invention relates to artificial kidney systems and more specifically to improved apparatus for coupling an artificial kidney to a patient.

In copending application Ser. No. 608,855, filed on Jan. 12, 1967 by Edward J. Mattson et al., there is disclosed an artificial kidney system including a cam operated coupling mechanism for coupling a dialyzing system to a shunt system connected to a patient's circulatory system. The coupling mechanism includes a rotary cam for coupling the ends of supply and return tubes of the shunt system to the ends of inlet and outlet tubes associated with the dialyzing system. The entire coupling mechanism is arranged to be operated by the patient on a table top or the like and arranged to facilitate the use of a disposable dialyzing system of the type disclosed and claimed in said application.

It is a principal object of the present invention to provide an improve artificial kidney system and an improved coupling mechanism for coupling a dialyzing system to the circulatory system of a patient.

Another object of the invention is to provide an improved artificial kidney system which permits the patient to engage in other activities to a greater extent during usage of the system.

Another object of the invention is to provide a coupling mechanism for coupling an artificial kidney to a patient's circulatory system which is mounted directly on a body portion of the patient.

In the disclosed specific embodiment of the invention a shunt blood system is associated with the patient's circulatory system and with a specific body portion of the patient such as the patient's forearm. A dialyzing system is provided for dialyzing the patient's blood. A coupling mechanism is arranged to receive the body portion of the patient and to selectively couple and uncouple the shunt system to the dialyzing system. The coupling mechanism is arranged to facilitate the patient's participation in other activities during dialysis. In the disclosed embodiment the coupling mechanism includes means for preventing the coupling of the two systems when parts of the system are improperly positioned in the mechanism and when parts of the mechanism are not in proper working order.

Other objects and advantages will become apparent from the following description taken in connection with the accompanying drawings wherein.

Figures 1, 2:
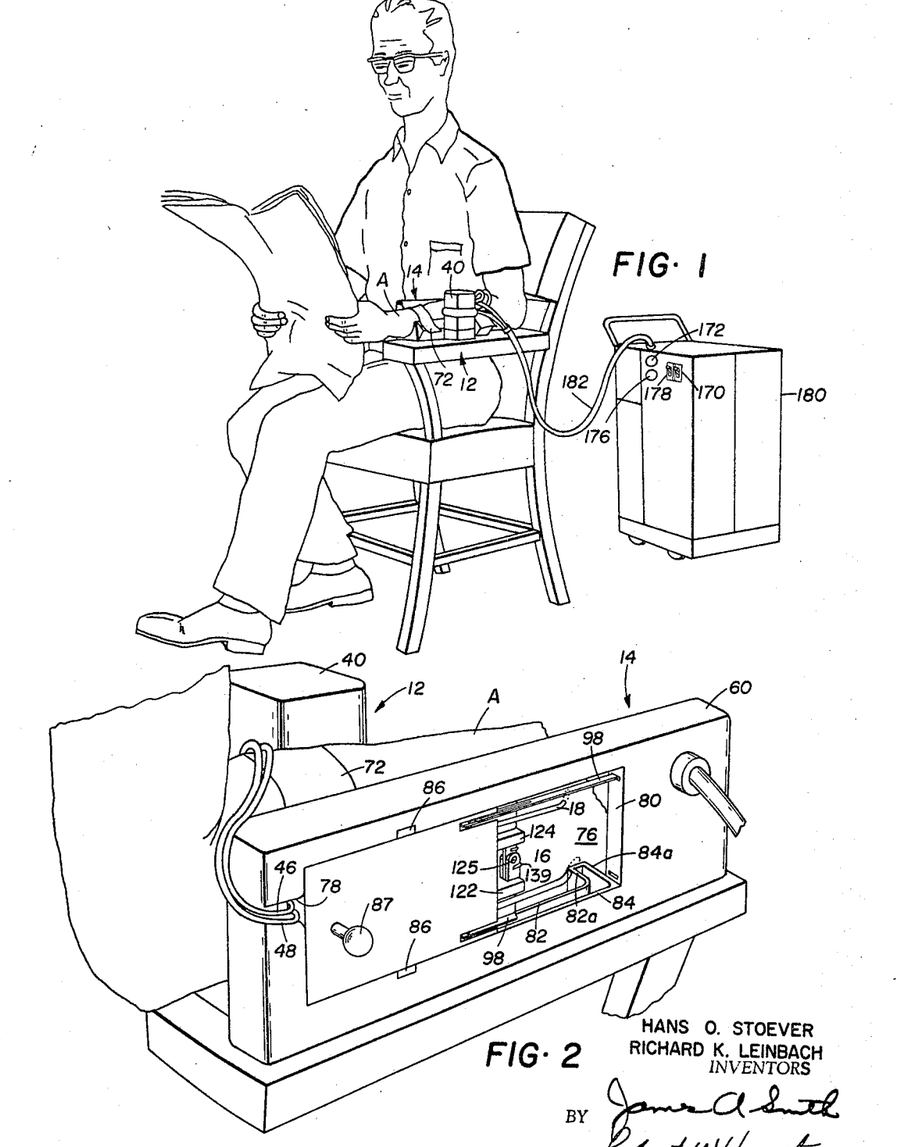
FIG. 1 is a pictorial representation of a patient using an artificial kidney system in accordance with the present invention.
FIG. 2 is a perspective view of a patient's arm and a coupling mechanism in accordance with the invention illustrating the position of the cover plate for the mechanism housing when the artificial kidney system is in use.

Referring to FIG. 1 of the drawings, there is shown pictorially a patient using an artificial kidney system in accordance with the present invention. As shown the patient may be seated at a chair and engage in activities such as reading while the system is being used.

The artificial kidney system in general includes a shunt system 10 for the patient's circulatory system (FIG. 4), a dialyzing system 12 for dialyzing the blood of the patent (FIGS. 1, 2, 3, and 11) and a coupling mechanism 14 (FIGS. 1, 2 and 3) for coupling the shunt system 10 to the dialyzing system 12. In the embodiment of the artificial kidney system disclosed the shunt system 10 and coupling mechanism 12 are associated with a patient's forearm A. It will be apparent, however, that the systems 10 and 12 may be adapted for use with other portions of the body to the extent permitted by medical considerations.

Shunt system 10

Figure 4:
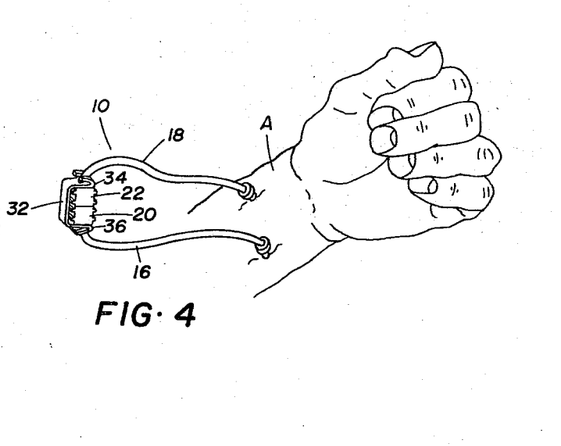
FIG. 4 is a perspective view illustrating a shunt system for a patient's circulatory system.

Referring to FIG. 4 of the drawings, the shunt system 10 comprises a pair of flexible conduits or tubes 16 and 18, the ends of which may be connected to suitable surgically implanted cannulation devices (not shown) in the patient's forearm which is identified generally by the reference numeral A. The cannulation devices are preferably associated with the patient's vein and artery and may take the form of the cannulation devices disclosed and claimed in copending application Ser. No. 608,907, filed on Jan. 12, 1967 by George Wolf and assigned to the same assignee as the present invention.

As shown more clearly in FIG. 5 of the drawings, the free ends of the tubes 16 and 18 are provided with coupling members 20 and 22 defining female and male fittings adapted to be joined or coupled together in the manner hereinafter described. Preferably the tubes 16 and 18 comprise flexible plastic tubes and the coupling members 20 and 22 comprise plastic parts molded on the ends of the tubes 16 and 18 respectively as shown in FIG. 5.

In the disclosed embodiment of the invention, the coupling member 20 comprises a rectangular shaped part defining a conical recess 24 in the left face surface thereof, the end of the tube 16 being positioned in the part 20 adjacent the small diameter inner end of the recess 24. Two opposite sides of the part 20 are provided with spaced guide ribs 26 adapted to be received by complemental recesses associated with a supporting means for the coupling member 20 which will hereinafter be described.

In the disclosed embodiment the coupling member 22 similarly comprises a rectangular shaped part which in this instance defines a conical shape projection 28 extending from the right face surface thereof and having a configuration complemental to the recess 24. The end portion of the tube 18 extends through the part 22 and into projection 28 in the manner shown in FIG. 5. The part 22 is similarly provided with guide ribs 30 on opposite face surfaces thereof to be received by complemental recesses in the supporting means hereinafter described.

Figure 5:
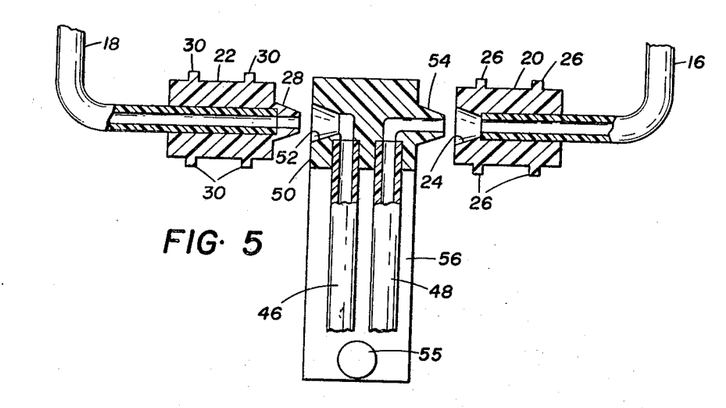
FIG. 5 is a plan view illustrating the fittings associated with the shunt system and dialyzing system and the method of coupling the same.

As will be apparent from FIGS. 4 and 5 of the drawing the couplying members 20 and 22 define female and male fittings respectively by means of the conical recess 24 and conical projection 28. During nonuse of the dialyzing system 12 the coupling members 20 and 22 are retained together as shown in FIG. 4 with their respective female and male fittings joined together to establish a shunt flow of blood from the patient's artery through tube 18, coupling members 20 and 22 and tube 16 back to the vein. During coupling of the dialyzing system 12 to the shunt system 10, coupling members 20 and 22 are separated as shown in FIG. 5 by the mechanism hereinafter described.

The coupling members 20 and 22 may comprise plastic parts integrally molded around their respective tube ends. As will be apparent to those skilled in the art, however, the coupling members 20 and 22 may have configurations other than that disclosed and may be variously formed on the tube ends.

During nonuse of the artificial kidney system the coupling members 20 and 22 may be retained together in the position shown in FIG. 4 by a retaining means comprising a generally U-shaped bracket 32 defining a pair of opposite legs 34 and 36. The legs 34 and 36 are provided with suitable slots of width sufficient to receive the tubes 16 and 18 respectively and are adapted to engage the ends of the coupling members 20 and 22 respectively as shown in FIG. 4. Preferably the legs 34 and 36 have a spacing slightly less than the length of the joined assembly of coupling members 20 and 22 so that they retain the coupling members together with a slight inherent bias which tends to force the conical projection 28 into tight sealing engagement with the recess 24. The patient may easily attach or remove the bracket 32 with his free hand by spreading the legs 34 and 36. The bracket 32 is generally similar to the bracket 30 disclosed and claimed in the aforementioned copending application Ser. No. 608,855 and further description is deemed to be unnecessary.

Dialyzing system 12

Figure 11:
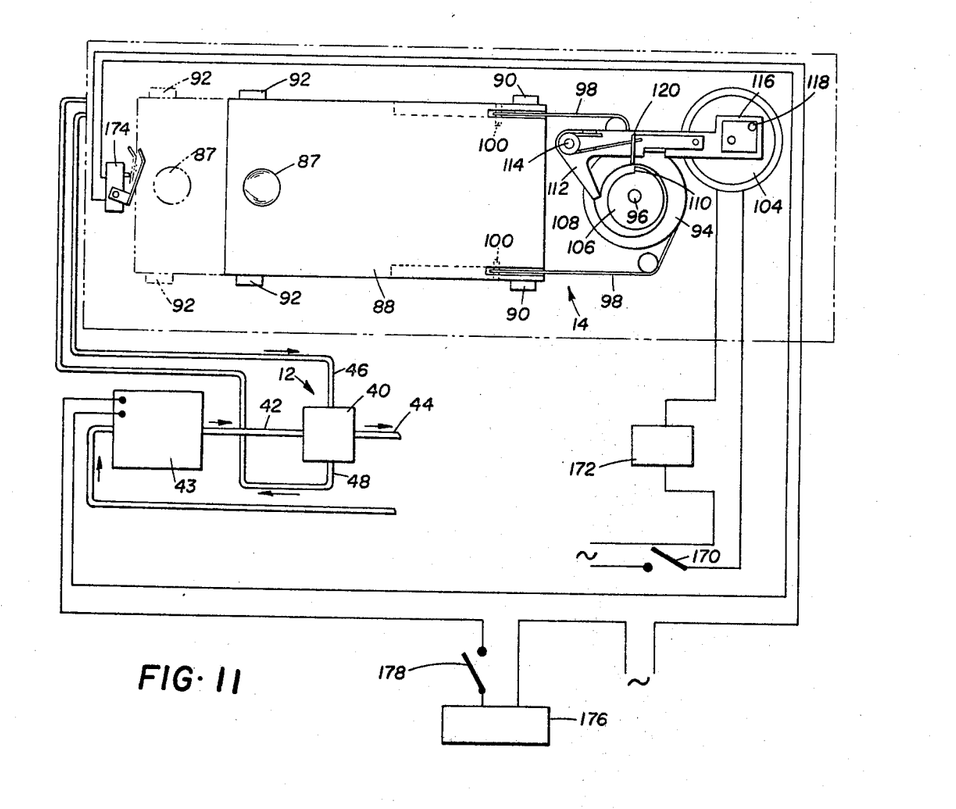
FIG. 11 is a top view in generally schematic form of the cover plate for the coupling mechanism and the mounting and operating means therefor in combination with electrical circuitry of the artificial kidney system.

Referring to FIG. 11 of the drawings the dialyzing system 12 includes a dialyzing device or artificial kidney 40 which may take the form of the dialyzing cartridge disclosed and claimed in copending application Ser. No. 608,784, filed on Jan. 12, 1967 by John J. Myers et al. and also assigned to the same assignee as the present invention. As disclosed in this copending application the caridge 40 comprises a housing containing a plurality of stacked dialyzing elements (not shown). As will be apparent from FIG. 11 the cartridge is provided with inlet and outlet fittings on two opposite sides thereof which are connected to conduits or tubes 42 and 44 for the circulation of dialyzing fluid through the cartridge. As shown in FIG. 11 the conduit 42 may connect the dialyzant inlet of the cartridge 40 to the outlet of a suitable pump 43 and the conduit 44 may be connected to waste (or back to the source if the dialyzant is recirculated).

The cartridge 40 is provided with suitable inlet and outlet fittings on the other two opposite sides thereof which are connected by conduits or tubes 46 and 48 respectively to a coupling member 50 (FIG. 5) adapted to be physically coupled to the coupling members 20 and 22 to couple the shunt system 10 to the dialyzing system 12. Preferably the conduits 46 and 48 comprise flexible plastic tubes and coupling member 50 comprises a molded plastic part to render the system comprising cartridge 40, tubes 46 and 48 and coupling member 50 disposable in accordance with the teaching of the copending application Ser. No. 608,855, filed on Jan. 12, 1967, by Edward J. Mattson et al. As described in application Ser. No. 608,784, the disposable system may be supplied filled with a solution which mixes with blood such as a saline solution in a suitable sterilized package and disposed of after each usage of the artificial kidney system.

Referring specifically to FIG. 5 the coupling member 50 in the disclosed embodiment also comprises a rectangular shaped part integrally molded on the end portions of the tubes 46 and 48 as shown. The end of the inlet tube 46 terminates in the part 50 at the end of a conical recess 52 in the left face surface of the part 50. The conical recess 52 is of configuration identical to recess 24 of coupling member 20 and defines a female fitting on the part 50 adapted to receive the male fitting defined by projection 28 of coupling member 22. The end of the tube 48 terminates in a conical shaped projection 54 formed on the right face surface of the part 50 and has a configuration identical to the projection 28 of coupling member 22 to define a male fitting on the part 50 adapted to be received by the female fitting defined by recess 24 of coupling member 20. When the coupling member 50 is positioned between the coupling members 20 and 22 as shown in FIG. 5, the coupling members 20 and 22 may be displaced toward the coupling member 50 to position projection 28 in recess 52 and projection 54 in recess 24 to couple the shunt system 10 to the dialyzing system 12.

Figure 9:
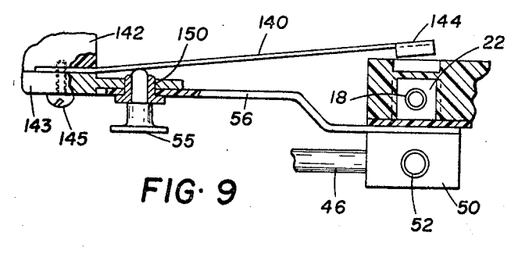
FIG. 9 is a side view of several parts of the coupling mechanism.

The coupling member 50 is further provided with an integral extending arm 56 to facilitate mounting of the coupling member 50 in the mechanism described below. The arm 56 is provided with an opening or bore in the free end thereof and is preferably provided with a thin cross section to be capable of spring flexure in the manner hereinafter described. To facilitate mounting of the coupling member 50 in the coupling mechanism 14 a lock pin assembly 55 of a form well known in the art and shown in detail in FIG. 9 is mounted in the opening. The dialyzing device 40, the tubes 46 and 48 and associated coupling member 50, and the arm 56 form a disposable assembly.

Coupling mechanism 14

Figure 3:
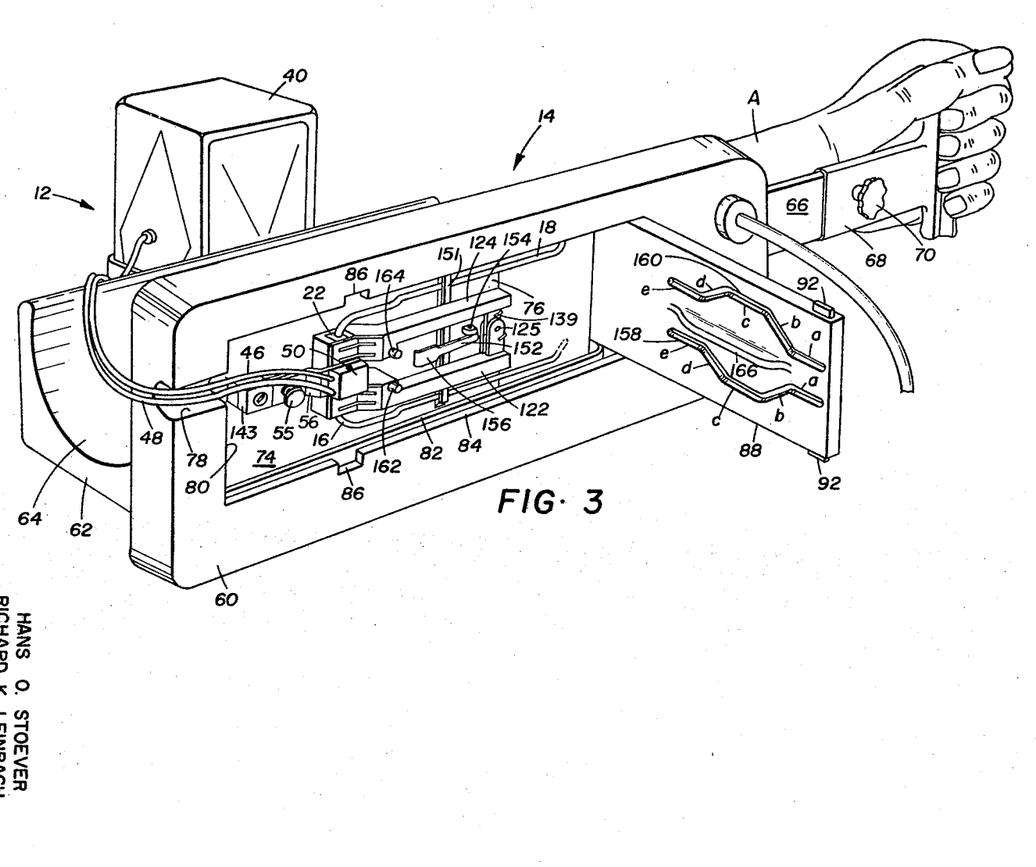
FIG. 3 is a perspective view of a patient's arm and the coupling mechanism shown in FIG. 2 with the cover of the mechanism housing open.

Referring to FIGS. 1, 2, and 3 of the drawings the coupling mechanism 14 includes a housing 60 of generally rectangular configuration and having a bracket 62 attached to the rear wall thereof for receiving the arm of the patient. As shown in FIG. 3 the bracket 62 defines an elongated curved surface 64 adapted to be engaged by the patient's arm and an extending bar 66 having a slidably mounted handle 68 on the end thereof adapted to be grasped by the patients' hand as shown. The handle 68 is clamped to the bar 66 by a rotatable clamping screw 70 threaded in the handle 68 and adapted to be screwed into clamping engagement with the bar 66. The position of the handle 68 may be adjusted in accordance with the arm length of the patient by means of screw 70.

Suitable straps 72 (FIGS. 1 and 2) may be mounted on the rear side of the housing 60 and bracket 62 to strap the patient's arm in the bracket 62. Such straps may take the form of simple web and buckle straps which can be manipulated by the free hand of the patient.

Referring specifically to FIGS. 2 and 3 the housing 60 defines an interior chamber 74 and has an opening 76 in the rear wall thereof through which the tubes 16 and 18 extend when the patient's arm is positioned in the bracket 62 as shown. The housing 60 is further provided with opening 78 in the end wall of the housing 60 through which the tubes 46 and 48 extend when the patient's arm is positioned in the bracket 62.

The housing 60 is further provided with an elongated rectangular shaped opening 80 in the front wall thereof defining a pair of spaced flanges or tracks 82 and 84 along both elongated edges thereof, each outer flange 84 being cut away or recessed at 86. A cover plate 88 having a manual positioning handle 87 is both slidably and pivotally mounted on the front wall of the housing 60 by means of tracks 82 and 84. The cover plate 88 is also of generally elongated rectangular configuration having a length less than that of opening 80 and having a width complemental to the width of opening 80 to be slidably received therein as shown in FIG. 2 of the drawings.

Figure 13:
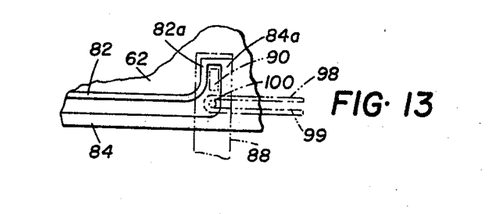
FIG. 13 is a fragmentary view illustrating the position of parts shown in FIG. 11 when the cover plate is in a different position.

As shown more clearly in FIG. 11 the cover plate 88 is provided with a pair of lugs 90 on opposite elongated edges thereof at one end thereof and a pair of lugs 92 on the opposite edges at the other end thereof, the lugs 90 and 92 being arranged to be slidably received between the flanges 82 and 84 to slidably position the plate 88 in the opening 80 for movement between opposite ends of the opening. The lugs 92 may be selectively engaged and disengaged from the flanges 82 and 84 by means of recesses 86 to permit opening and closing of the cover plate 88 when the latter is in the position shown in FIG. 3 and the position shown in solid lines in FIG. 11. To facilitate opening and closing of the cover plate 88 the flanges 82 and 84 are provided with suitable right angled extensions 82a and 84a at the right end thereof adapted to receive the lugs 90 during opening movement of the cover plate 88 as shown in FIG. 13 of the drawings. The rectangular shape of the lugs 90 acting against the flange surfaces facilitates retention of the cover plate 88 in the open position shown in FIG. 3. To close the cover plate 88 the plate may be first lifted outward slightly to retract the lugs 90 from the extensions of the flanges 82 and 84 whereupon it may be pivoted to a closed position to position lugs 92 in recesses 86. The cover plate may then be slid to the position shown in FIG. 2 of the drawings (indicated in dashed lines in FIG. 11). The cover plate 88 is thus pivotal between open and closed positions by means of lugs 90 and extensions 82a and 84a and when closed can be slidably displaced between first and second controlling positions which are indicated by the solid and dashed lines in FIG. 11 and which correspond to the uncoupled and coupled conditions of the shunt system 10 and dialyzing system 12 respectively as will hereinafter be described.

Biasing means are provided for biasing the cover plate 88 to the position shown in solid lines in FIG. 11. As shown in FIG. 11 this means comprises a spring motor assembly of known form having a housing 94 rotatably mounted on a shaft 96 fixed to the rear wall of the housing 60 in the right hand portion of the housing as viewed and indicated schematically in FIG. 11. The motor assembly includes a pair of elongated flexible spring strips 98 extended around suitable guide pulleys to the cover plate 88 and adapted to be unwound from the housing 94 against the winding force thereof upon displacement of the cover plate 88 to the left as viewed in FIG. 11. The end portions of the spring strips 98 are provided with elongated slots 99 (FIGS. 12 and 13) of length at least equal to the length of travel of the cover plate 88. A pair of juxtaposed pins 100 fixed to the cover plate 88 in suitable recesses in the underside of the plate are received by the slots 99 of the spring strips to operatively connect the cover plate 88 to the spring motor.

The spring motor exerts a retracting force on the spring strips 98 tending to retract the same into the rotatable housing thereof and tending to cause the left end of the slots 99 to engage the pins 100 to thereby bias the cover plate 88 to the position shown in solid lines in FIG. 11. In addition when the cover plate 88 is in the open position shown in FIGS. 3 and 13, the spring motor exerts a force on the cover plate 88 tending to retain the plate in said open position.

Figure 14:
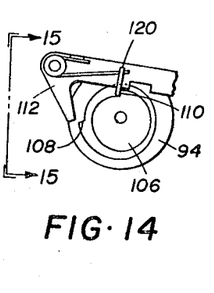
FIG. 14 is a fragmentary view illustrating different positions of parts shown in FIG. 11.
Figure 15:
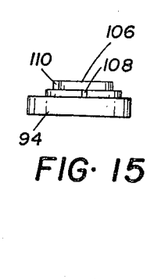
FIG. 15 is a side view of the cam means shown in FIG. 11.

Detent means are provided for latching or locking the cover plate 88 in the first and second positions thereof described above and shown in FIG. 11 by the solid and dashed lines respectively. This means comprises an escapement type of mechanism operated by an electrically operative means comprising a rotary solenoid 104. More specifically a rotary cam 106 is fixed to and rotatable with the housing 94 and defines a pair of cam surfaces defining abutments 108 and 110 on two different levels as shown in FIG. 15. The abutment 108 is adapted to be engaged by one end of a lever 112 pivotally mounted on a pin 114. The other end of the lever 112 defines a frame 116 engaged by a movable actuating pin 118 of the rotary solenoid 104. A spring biased pawl 120 is carried by the lever 112 and adapted to be engaged by the abutment 110 when the lever 112 is displaced from the position shown in FIG. 11 to the position shown in FIG. 14.

Figure 10:
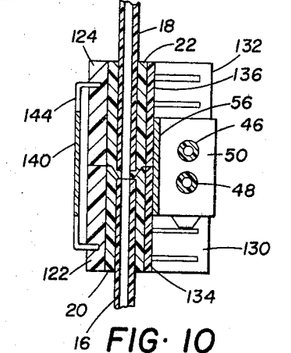
FIG. 10 is a top view in partial section of several parts of the coupling mechanism.

When the solenoid 104 is de-energized the end of lever 112 is positioned as shown in FIG. 11 and will be engaged by abutment 108 if it is attempted to displace the cover plate 88 to the left to the position shown in dashed lines. Accordingly, the housing 94 cannot be rotated and the cover plate 88 is effectively latched in the position shown in solid lines in FIG. 11 which corresponds to the uncoupled condition of the shunt system 10 and dialyzing system 12. If the solenoid 104 is energized, lever 112 will be displaced to the position shown in FIG. 14 wherein the end of lever 112 is displaced from the abutment 108. The cover plate 88 may then be displaced to the left to the position shown in dashed lines in FIG. 11, the spring strips being withdrawn from the spring motor by clockwise rotation of the housing 94 as viewed in FIG. 11. When the solenoid 104 is energized spring biased pawl 120 is moved into alignment with abutment 110. When the housing 94 rotates clockwise during displacement of the cover plate 88 to the left abutment 110 moves relative to the pawl with a ratcheting action by means of the curved surface of the cam and as a result of orientation of the abutment 110 relative to the direction of movement of the housing 94. The orientation of the abutment 110 is such, however, that housing 94 cannot be displaced counterclockwise by the biasing force of the spring motor while the solenoid is energized, such movement being prevented by engagement of abutment 110 with the pawl 120. Accordingly, when the cover plate 88 is displaced to the position shown in dashed lines in FIG. 10 the pawl 120 will effectively latch the spring motor as long as the solenoid 104 is energized to prevent the spring force of the latter from returning the cover plate 88 to its initial position. If solenoid 104 should become de-energized the pawl 120 will release the spring motor and the cam plate 88 will be automatically returned to the position shown in solid lines, the abutment 108 in this case moving past the end of lever 112 with a ratcheting action due to the orientation of the abutment 108 with the direction of rotation of the cam.

Figure 12:
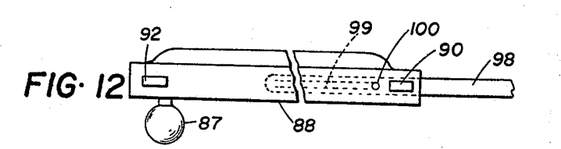
FIG. 12 is a side view of the cover plate shown in FIG. 11 taken in a different position of the cover plate.

When the cover plate 88 is in the position shown in dashed lines in FIG. 11, which corresponds to the coupled condition of the systems 10 and 12, it may be displaced manually to its initial position by means of slots 99 in the spring strips. Pins 100 will be displaced in the slots 99 and the spring strips will remain extended as shown in FIG. 12 and received by suitable recesses of the plate 88 indicated by dashed lines in FIG. 11. This feature enables the patient to uncouple the systems 10 and 12 manually.

Referring now to FIGS. 3 and 6–10 and to the specific mechanism for supporting and positioning the coupling members 20, 22 and 50 within housing 60, a pair of pivotal levers 122 and 124 are pivotally mounted at one end on the rear wall of the housing 60 by a common pivot pin 125 and extend in spaced substantially parallel relationship in the position shown in FIG. 3. The left end portions of the levers 122 and 124, which are offset as shown, define transverse slots 126 and 128 respectively (FIG. 6) complemental in width to the coupling members 20 and 22 respectively. The slots 126 and 128 are provided with recesses complemental to the flanges 26 and 30 of coupling members 20 and 22 respectively and are thus arranged so that when the left end portions of the levers 122 and 124 are in the positions shown in FIGS. 3, 6 and 7 the joined assembly of coupling members 20 and 22 may be inserted in the slots 126 and 128 after removal of the bracket 32, the flanges 26 and 30 and complemental recesses of slots 126 and 128 serving to index the positions of the coupling members.

Figure 6:
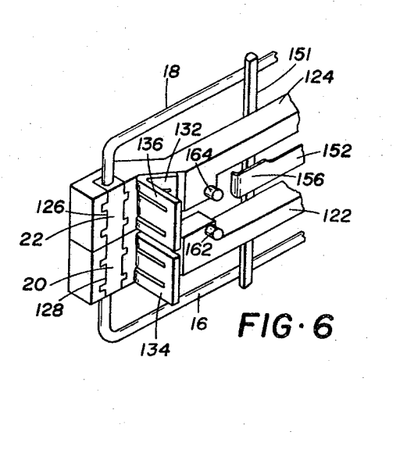
FIGS. 6, 7, and 8 are perspective views of parts of the coupling mechanism illustrating the operation of the coupling mechanism.

Biasing means are provided for biasing the levers 122 and 124 to the positions shown in FIG. 6. This means comprises a coil spring 139 associated with pin 125 and the lever ends to bias the levers toward each other. The spring 139 also biases the fittings defined by coupling members 20 and 22 into sealed coupled engagement.

Figure 7:
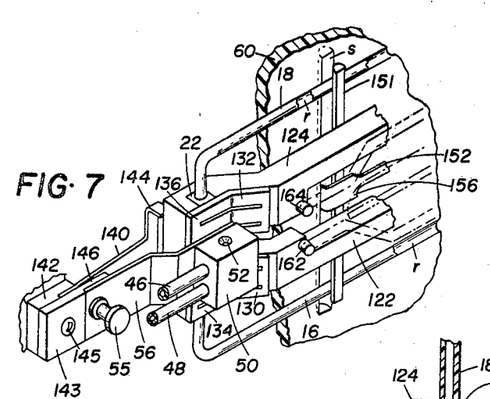
Figure 8:
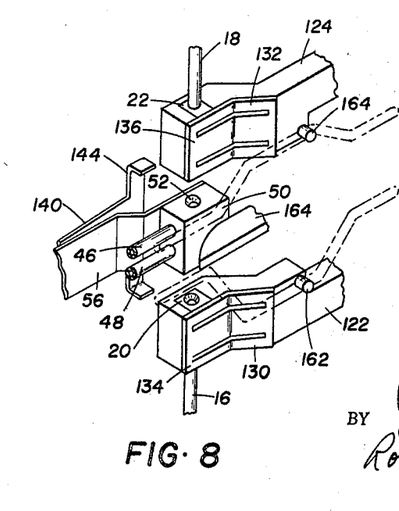

Referring to FIGS. 6 to 8, means are provided for retaining the coupling members 20 and 22 in the slots 126 and 128 respectively. This means comprises a pair of retaining members having portions 130 and 132 fixed to the levers 122 and 124 respectively and hinged plate portions 134 and 136 movable relative to portions 130 and 132 about the axis defined by the intersection of said portions to define cover plates for the slots 126 and 128 respectively as illustrated in FIG. 6. The plate portions 134 and 136 are suitably hinged to the portions 130 and 132 to be movable from the position shown in FIG. 6 to the position shown in FIG. 7 with a snap action to engage and retain the coupling members 20 and 22 in slots 126 and 128. Integral plastic hinges for achieving this action are well known in the art and further description is deemed to be unnecessary.

Means are also provided for retaining the levers 122 and 124 in the position shown in FIGS. 3, 6, 7, and 10 prior to insertion of the coupling member 50 in the manner described below. As shown in FIGS. 7, 8 and 9 this means comprises a cantilever spring arm 140, the end of which is clamped to a post 142 on the rear wall of the housing 60 by a clamp 143 and screw 145 as shown. The spring arm 140 defines a U-shaped bracket 144 on the free end thereof having arms adapted to engage complemental recesses in the end portions of the levers 122 and 124 as shown more clearly in FIG. 10 under the bias of the spring arm 140 to retain the levers 122 and 124 in the positions shown in FIGS. 3, 6, 7 and 10. Such retention of the levers 122 and 124 facilitates insertion of the joined coupling members 20 and 22 and prevents displacement of said levers to separate the coupling members before insertion of the coupling member 50 in the manner described below.

Referring now to the means for supporting coupling member 50, the arm 56 of the coupling member 50 is adapted to be retained on a flange 146 extending from the clamp 143 by the lock pin assembly 55. The pin assembly is adapted to be inserted through an opening 150 of the flange 146 as shown in FIG. 9. The outer bushing of the pin assembly 55 is provided with suitable projections cooperative with edges of the opening 150 to firmly retain the pin assembly 55 and arm 56 to the flange 146. The pin of the lock pin assembly is additionally provided with sufficient length to engage and displace the spring arm 140 in a direction to disengage the arms of bracket 144 from the recesses in levers 122 and 124 as shown in FIG. 9 to thereby free the levers for displacement by the cam means detachably supporting the coupling member 50 within the housing 60 and for releasing the retaining means defined by bracket 144.

The opening 150 of the flange 146 is preferably located with respect to a shoulder of the clamp 143 whereby the straight edge of the arm 56 must be seated firmly against said shoulder to position the pin assembly in alignment with opening 150. The pin assembly accordingly cannot be inserted and the bracket 144 cannot be released unless the coupling member 50 is oriented properly on the supporting means therefor.

The coupling mechanism further includes tube clamping means for clamping the tubes 16 and 18 during a coupling or uncoupling operation to prevent blood loss from the shunt system 10 while the coupling members 20 and 22 are separated in the manner hereinafter described. Referring to FIG. 3, during use of the coupling mechanism 14 the tubes 16 and 18 extend from the patient's arm, through the opening 76 in the rear wall of the housing 60 and along the rear wall to the coupling members 20 and 22. Elongated recesses (r) in the surface of the rear wall are arranged to receive the tubes 16 and 18 to facilitate retention of the same in the spaced relationship shown in FIG. 7. In the disclosed embodiment the clamping means takes the form of a clamping bar 151 fixed to the end of a lever arm 152 pivotally mounted on the rear wall of the housing 60 by a bracket and pin assembly 154 and defining an actuating surface 156 adapted to be engaged by the cam means later to be described. When pressure is applied to the surface 156 the bar 151 will be displaced by lever arm 152 into engagement with the tubes 16 and 18 to clamp the same. The clamping bar 151 is positioned in overlying relationship with a transverse recess (s) in the surface of the rear wall of the housing 60 having the same depth as recesses (r). Displacement of lever arm 152 tends to position bar 151 into recess (s) to render the bar 151 operative in the plane of the tubes 16 and 18.

To facilitate retention of the tubes 16 and 18 in recesses (r) the lever 152 may be spring biased to normally position bar 151 into retaining engagement with tubes 16 and 18 without clamping the tubes. This bias may be established for example by a coil spring (not shown) associated with the bracket and pin assembly and operatively connected to lever 152.

Referring now to the means for displacing coupling members 20, 22 and 50 and lever 152 cam means are integrally formed on the rear surface of the cover plate 88 to effect a predetermined sequence of movement of the parts when the cover plate is displaced between the positions shown in solid and dashed lines in FIG. 11. As shown in FIG. 3 the cover plate 88 defines a pair of elongated grooves 158 and 160 adapted to receive actuating pins 162 and 164 fixed to levers 122 and 124 respectively when the cover plate 88 is closed and then to displace said pins and levers respectively when the cover plate is displaced to the position indicated in dashed lines in FIG. 11. The cover plate is further provided with a cover surface 166 adapted to engage actuating surface 156 of lever 152 and coupling member 50 during displacement of the cover plate 88.

Referring now to the specific sequence of movements effected by the cam means defined by the cover plate 88, when the cover plate is initially displaced to a closed position pins 162 and 164 will be positioned in parallel portions (a) of the grooves 158 and 160 respectively which have a spacing complemental to the spacing of the pins when the levers 122 and 124 are in the positions shown in FIGS. 3 and 7. If the cover plate 88 is displaced to the left toward the position shown in dashed lines in FIG. 11, cam surface 166 will first engage and depress lever 152 to displace bar 151 into clamping engagement with tubes 16 and 18 to stop the flow of blood in the shunt system 10. Further movement of the cover plate will cause portions (b) of grooves 158 and 160 to displace pins 162 and 164 and levers 122 and 124 to the positions illustrated in FIG. 8. Such displacement of the levers 122 and 124 uncouples the coupling members 20 and 22 as shown and positions the same in spaced relationship.

Still further movement of plate 88 will cause pins 162 and 164 to ride in parallel portions (c) of the grooves 158 and 160 respectively to thereby maintain levers 122 and 124 in the position shown in FIG. 8 and will cause the end of cam surface 166 to engage and displace coupling member 50 toward the position shown in FIG. 8 against the bias of the arm 56. When the coupling member 50 is engaged by the flat elongated portion of surface 166 the coupling member will be positioned between the coupling members 20 and 22 in coupling alignment therewith as shown in FIG. 8.

Further movement of cover plate 88 will cause portions (d) of grooves 158 and 160 to displace pins 162 and 164 and levers 122 and 124 back toward their initial position to thereby couple the coupling members 20 and 22 to the coupling member 50 thereby coupling the shunt system 10 to the dialyzing system 12. After the coupling is complete pins 162 and 164 will ride in portions (e) of grooves 158 and 160 respectively and surface 166 will move out of engagement with actuating surface 156 to release clamping bar 151 and thereby unclamp tubes 16 and 18.

It will be apparent that when the cover plate 88 is returned to its initial position the above movements will occur in reverse sequence to uncouple the shunt system 10 and dialyzing system 12.

Referring now to the circuitry for the kidney system the solenoid 104 is connected in a series with an on-off switch 170 and an indicating lamp 172 across a power source as illustrated in FIG. 11.

To control energization of the dialyzant pump 43 a switch 174 is positioned in the left portion of the housing 60 to be engaged and closed by the cover plate 88 in the "coupled" position thereof. The switch 174 is connected in series with the pump motor, an indicating lamp 176 and a manual "on-off" switch 178 across a power source. The arrangement is such that the pump cannot be started by closure of switch 178 until systems 10 and 12 are fully coupled.

Referring to FIG. 1 of the drawings the pump 43 and a reservoir for dialyzant may be positioned in a console 180, and the cartridge 40 may be positioned in close proximity to the coupling mechanism 14 to minimize the length of the blood tubes 46 and 48 (FIG. 11). A suitable cable 182 may be arranged to contain the conduits 42 and 44 for dialyzant fluid and the electrical connections for solenoid 104 and switch 174 and the circuitry within the console. The on-off switches 170 and 178 may be located on the console as shown or optionally may be mounted on the housing 60 of the coupling mechanism.

Operation

In operation of the artificial kidney system disclosed, the shunt system 10 is carried by the patient in the manner shown in FIG. 4 of the drawings during nonuse of the system. When dialysis is necessary the patient may sit on a chair as indicated in FIG. 1 or comfortably position himself in some other manner where he can engage in personal activities compatible to use of the kidney system.

To couple the shunt system 10 to the dialyzing system 14 the cover plate 88 of the coupling mechanism is first opened as shown in FIG. 3 and the patient's arm is inserted in bracket 62. During insertion of the arm, the tubes 16 and 18 and the coupled assembly of coupling members 20 and 22 are positioned through opening 76 in the rear wall of the housing 60. The patient's arm may then be strapped to the bracket 62 by straps 72 as shown in FIGS. 1 and 2.

The patient may next position the tubes 16 and 18 under the clamping bar 151 and in recess (r) and may then open cover plates 134 and 136 to expose the slots 126 and 128 in levers 122 and 124 respectively. The bracket 32 may then be removed from the coupling members 20 and 22 whereupon the coupled assembly may be positioned in slots 126 and 128 as shown in FIG. 6.

The coupling member 50 is then positioned in the housing 60 and the arm 56 thereof is attached to the flange 146 by the lock pin assembly 55 to position the coupling member 50 adjacent to coupling members 20 and 22. Insertion of the lock pin assembly 55 in flange 146 to attach arm 56 is effective to displace lever arm 140 and release the retaining means defined by bracket 144 in the manner hereinbefore described.

Upon positioning of the coupling members 20, 22 and 50 in the manner described the cover plate 88 may be closed to cause lugs 92 to engage tracks 82 and 84 whereupon switch 170 may be closed to effect energization of the solenoid 104 which will displace lever 112 to unlatch the housing 94 of the spring motor in the manner hereinbefore described to free cover plate 88 for displacement to couple the shunt system 10 to the dialyzing system 14. The patient may then displace cover plate 88 to the position shown in FIG. 2. Such movement will cause the cam means defined by the cover plate to sequentially actuate lever 152 to clamp tubes 16 and 18, displace levers 122 and 124 to the positions shown in FIG. 8, displace member 50 to the position shown in FIG. 8, displace levers 122 and 124 to the position shown in FIG. 10 to couple the members 20 and 22 to member 50, release clamping bar 151 to unclamp tubes 16 and 18, and close switch 174 to condition the pump circuit for energization.

The escapement mechanism comprising cam means 106, lever 112, and pawl 120 will prevent retraction of the spring strip 98 and return displacement of the cover plate 88 by the spring force of the spring motor during energization of the solenoid. Thus when the cover plate 88 is fully displaced to the position shown in dashed lines in FIG. 11 and released by the patient, pawl 120 will be engaged by abutment 110 and the spring strips 98 will be latched in the extended condition.

When the cover plate 88 has been displaced to the position shown in FIG. 3 the shunt system 10 will be fully coupled to the dialyzing system 14. Pump 43 may then be energized by closure of switch 178 to effect circulation of dialyzing fluid through the cartridge 40.

The patient may now relax and engage in reading or other activities to the extent possible during the period of dialysis required. If at any time during the dialyzing operation a power failure should occur, the solenoid 104 will become de-energized to displace lever 112 to the position shown in FIG. 11. Such displacement of the lever 112 will unlatch spring motor housing 94 whereupon springs 98 will be retracted into housing 94 and cover plate 88 will be displaced to the position shown in solid lines in FIG. 11. Accordingly, the shunt system 10 will be automatically uncoupled from the dialyzing system 12.

If dialysis is completed in the normal manner the patient may uncouple the shunt system 10 from the dialyzing system 12 by opening switch 170 to release housing 94. Optionally he may manually position cover plate 88 to the uncoupled position thereof, the springs 98 in this case remaining extended and the pins moving in slots 99 as indicated in FIG. 12.

During coupling and uncoupling of the shut system 10 and dialyzing system 12, the patient may grasp the handle 68 in the manner shown in FIG. 3 to more rigidly support the mechanism 14 and facilitate displacement of the cover plate 88 by his free hand. During dialysis he may release the handle 68 and participate in activities such as reading.

While it is believed that a patient would prefer a sitting or other non-standing position during dialysis, the patient may move about with the coupling mechanism 14 attached to his body to the extent permitted by the connecting tubing and medical considerations.

The disclosed system is capable of being utilized in the home without medical supervision. The unique interlocking and safety features herein disclosed render the mechanism safe for independent use with disposable dialyzing systems by most patients after brief instruction.

It will be apparent that in construction of an artificial kidney system similar to that herein disclosed as one embodiment of the invention, many structural refinements would be incorporated which are not herein disclosed. For example, the male and female fittings defined by coupling members 20, 22, and 50 may be provided with interlocking surfaces to facilitate retention of the members in a coupled condition. Such structural refinements are clearly within the ability of one skilled in the art and further description is deemed to be unnecessary.

While the invention has been described in detail with particular reference to preferred embodiments thereof, it will be understood that variations and modifications can be effected within the spirit and scope of the invention herein described and as defined in the appended claims.

We claim:

1. In an artificial kidney system having a dialyzing system defining flexible inlet and outlet tubes for blood and a shunt system for a patient's circulatory system defining flexible supply and return tubes for blood, the combination comprising:
   a support;
   a pair of levers pivotally mounted on said support for pivotal displacement between first and second positions relative to said support;
   releasable means for retaining said levers in said first position thereof;
   first and second coupling members associated with the ends of the supply and return tubes adapted to be supported on said levers;
   said first and second coupling members being coupled together in said first positions of said levers and in spaced uncoupled relationship in said second positions of said levers;
   a third coupling member associated with the ends of the inlet and outlet tubes adapted to be coupled to the first and second coupling members respectively;
   means for placing said third coupling member in an operative relationship with said first and second coupling members and for simultaneously releasing said retaining means; and
   means for sequentially displacing said levers from said first to said second positions thereof, positioning said third member between said first and second coupling members, and displacing said levers toward said first positions thereof to couple said first and second coupling members to said third coupling member.

2. In an artificial kidney system as claimed in claim 1 wherein said levers define transverse slots respectively in which said first and second coupling members are positioned and further including means for retaining said first and second coupling members in said slots.

3. In an artificial kidney system as claimed in claim 2 wherein said retaining means for said first and second coupling members comprises cover plates for said slots biased to a closed position relative to said slots.

4. In an artificial kidney system having a dialyzing system defining inlet and outlet tubes for blood and a shunt system for a patient's circulatory system defining supply and return tubes for blood, the combination comprising:
   a housing;
   a pair of levers pivotally mounted in said housing for displacement between first and second positions relative thereto;
   first and second coupling members associated with the ends of said supply and return tubes respectively and adapted to be coupled together;
   means for supporting said first and second coupling members on said levers respectively, said first and second coupling members being coupled together in said first position of said levers and positioned in spaced uncoupled relationship with each other in said said position of said levers;
   releasable means for retaining said levers in said first position thereof;
   a support on said housing;
   a third coupling member associated with the ends of the inlet and outlet tubes and adapted to be coupled to said first and second coupling members;
   an arm extending from said third coupling member adapted to engage said support to position said third coupling member in operative relationship with said first and second coupling members;
   retaining means displaceable to a retaining position for retaining said arm on said support and for releasing said releasable means; and
   cam means for sequentially displacing said levers to uncouple said first and second coupling members, displacing said third coupling member into a coupling position relative to said first and second coupling members, and displacing said levers to couple said first and second coupling members to said third coupling member.

5. In an artificial kidney system as claimed in claim 4 wherein said retaining means for said levers comprises a flexible spring arm fixed at one end to said housing and a U-shaped bracket on the other end of said spring arm adapted to engage recesses in said levers under the bias of said spring arm.

6. In an artificial kidney system as claimed in claim 5 wherein said retaining means for said arm of said coupling member comprises a lock pin assembly including a movable pin displaceable to a locking position and into engagement with said flexible spring arm to displace said bracket from said recess.

7. In an artificial kidney system for dialyzing the blood of a patient, the combination comprising:
   a dialyzing system defining inlet and outlet tubes for blood;
   a shunt system adapted to be connected to the patient's circulatory system and defining supply and return tubes for blood;
   first and second coupling members associated with the ends of said supply and return tubes and adapted to be coupled together;
   a third coupling member associated with the ends of the inlet and outlet tubes;
   means for movably supporting said first and second coupling members;
   releasable means for retaining said first and second coupling members in coupled relationship;
   releasable retaining means for movably supporting said third coupling member in operative relationship with said first and second coupling members and for releasing said releasable retaining means for said first and second coupling members; and
   means for positioning said coupling members to uncouple said first and second coupling members and to couple said first and second coupling members to said third coupling member.

8. In an artificial kidney system as claimed in claim 7 wherein said dialyzing system, said third coupling member and said releasable retaining means for said third supporting member comprises a disposable system.

9. In an artificial kidney system as claimed in claim 8 wherein said coupling member comprises a plastic part molded on the ends of said inlet and outlet tubes and having a flexible arm extending therefrom; said releasable retaining means for said third coupling member comprising a lock pin assembly carried on said flexible arm.

References Cited

UNITED STATES PATENTS

| 1,151,300 | 8/1915 | Soresi | 128—214 |
| 2,880,501 | 4/1959 | Metz | 210—321 X |

OTHER REFERENCES

Nayman: Lancet, 1964, #7329, p. 365.
Kolff: Journal Labr. and Clin. Med., vol. 47, #6, June 1956, pp. 969–977.

DALTON L. TRULUCK, Primary Examiner

U. S. Cl. X.R.

128—348; 285—31, 33